Figure 1:
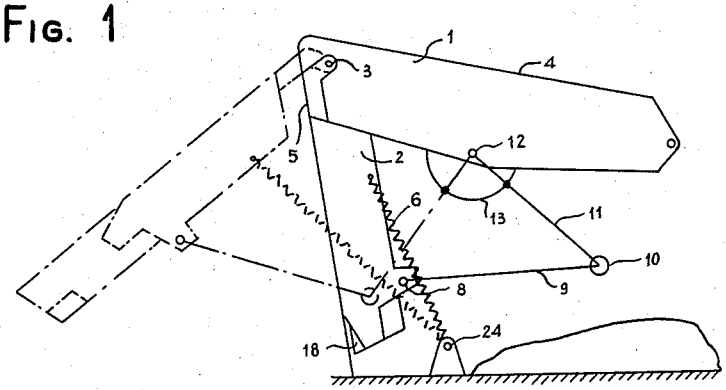

Dec. 29, 1959      F. BRAUN      2,918,964
LEG-REST FOR A SEAT

Filed July 19, 1957      3 Sheets-Sheet 1

INVENTOR.
FRANCOIS BRAUN
BY
Irvin S. Thompson
ATTY.

INVENTOR.
FRANCOIS BRAUN

Dec. 29, 1959 F. BRAUN 2,918,964
LEG-REST FOR A SEAT
Filed July 19, 1957 3 Sheets-Sheet 3

INVENTOR.
FRANCOIS BRAUN
BY
Irvin S. Thompson
ATTY.

United States Patent Office 2,918,964
Patented Dec. 29, 1959

2,918,964

LEG-REST FOR A SEAT

François Braun, Schaerbeek, Belgium

Application July 19, 1957, Serial No. 672,964

Claims priority, application Belgium July 31, 1956

7 Claims. (Cl. 155—171)

The present invention relates to a seat provided with a leg-rest pivoting about a horizontal axis positioned at the front of the seat bottom in such manner that it may be brought from the position underneath the said seat bottom, designated the "retracted position," into a position substantially in alignment with the said bottom, designated the "comfort position," the said leg-rest being provided with an extension.

The invention is applicable to any seat of the aforementioned type and particularly to seats for land vehicles and aircraft.

Seats of the aforementioned type are known, in which the extension is connected to the leg-rest by a hinge and is folded behind the leg-rest prior to retracting the latter under the bottom, whereas it is maintained in the comfort position by a foot pivoted relatively thereto and adapted to be locked in a number of angular positions.

These leg-rests cannot be manipulated by the passenger who is seated and inclined rearwardly in the normal manner and, furthermore, the movements of the leg-rest and the extension are not continuous. Furthermore, they do not provide a great variety of positions.

The present invention has for its object a seat provided with a leg-rest and an extension, the said seat not having any of these various disadvantages.

To this end, the seat according to the invention is characterized in that the leg-rest is permanently urged by a spring from the retracted position into the comfort position, whilst a bolt, adapted to be manipulated by the occupant of the seat, enables the leg-rest to be locked in the desired position, and in that the extension is mounted in such manner as to be able to slide in the pivoting leg-rest.

A simple manner of carrying the invention into effect consists in connecting one end of the spring to the leg-rest and the other end thereof to the hinge point of the two arms articulated to each other, one of said arms being furthermore pivoted to the leg-rest, the other to the seat.

According to a feature of the invention, the spring acts on the afore-mentioned hinge point via a flexible strap passing over a pulley arranged near the pivot of the leg-rest. Under the action of the spring, the leg-rest is brought into a position substantially parallel to the plane of the seat bottom upon which the passenger is seated.

According to a further feature of the invention, the spring bears on the leg-rest and on the extension, the latter being connected to the hinge point by means of the flexible strap in such manner that the extension, by its sliding movement, acts on the leg-rest and tends to pivot it towards the comfort position.

According to a further feature of the invention, a second spring acts on the hinge point of the two arms via the flexible strap in order to move the leg-rest towards the comfort position.

According to a further feature of the invention, the force of the first spring is greater than that of the second spring, so that the latter begins to act only when the first extension can be moved out to the maximum extent permitted by its stop means, under the action of the first spring, before the second spring has begun to act on the leg-rest and to displace it towards the comfort position.

Further features and details of the invention will become apparent during the description of the drawings accompanying the present specification, which drawings show diagrammatically and solely by way of example a number of embodiments of the seat provided with a leg-rest and with an extension according to the invention.

Figures 1 to 6 each show a diagrammatic side elevation of a different embodiment of a seat provided with spring is at the end of its travel. Due to this feature, the a leg-rest and an extension according to the invention.

Figure 5:
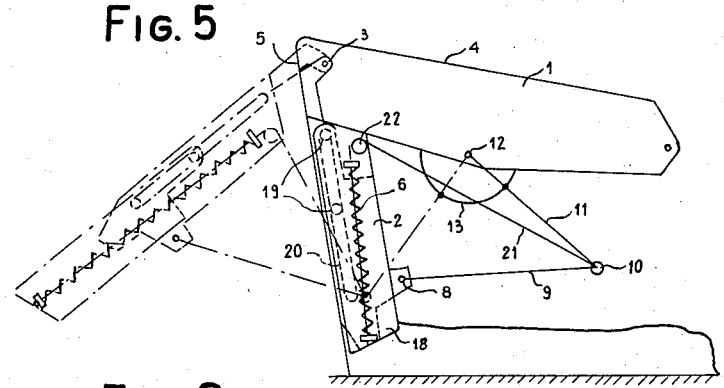
Figure 6:
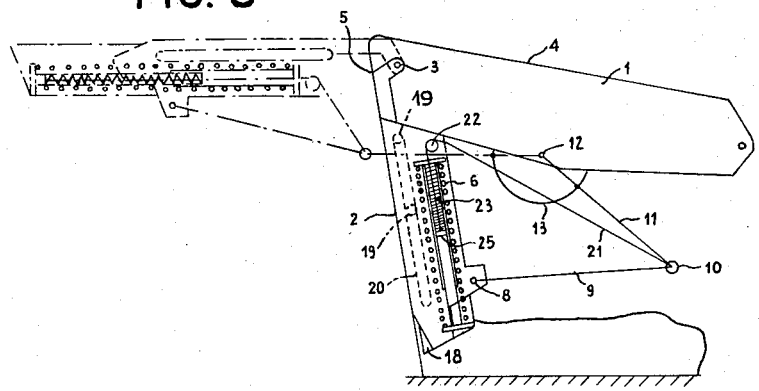
Figure 7:
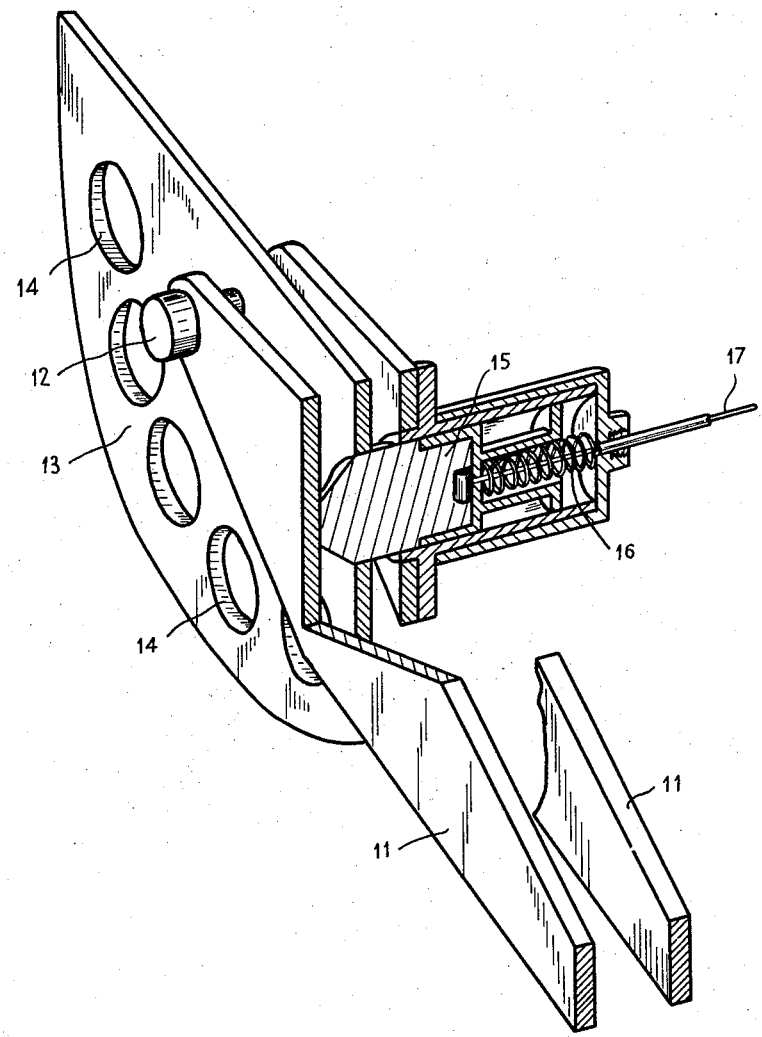

Figure 7 is a perspective view, partially in section of the system provided for the locking of the leg-rest in each of the embodiments illustrated in Figures 1 to 6.

In these various figures, the same reference numerals designate identical elements. Furthermore, the leg-rest and the extension in the retracted position are shown in full lines, whereas the same members in an extended position are shown in chain-dotted line.

The seat illustrated in the various figures comprises a seat bottom 1, at the front of which a leg-rest 2 pivots on a pivot pin 3. This pivot is advantageously positioned equidistant from the upper face 4 of the bottom and from the front face 5 of the leg-rest.

In the retracted position, the leg-rest is disposed below the bottom.

The leg-rest may be moved into different positions by pivoting about its pivot 3, and particularly into a position called the "comfort" position, shown in chain-dotted line in Fig. 6, substantially level with the plane of the seat bottom upon which the passenger is seated.

Figure 2:
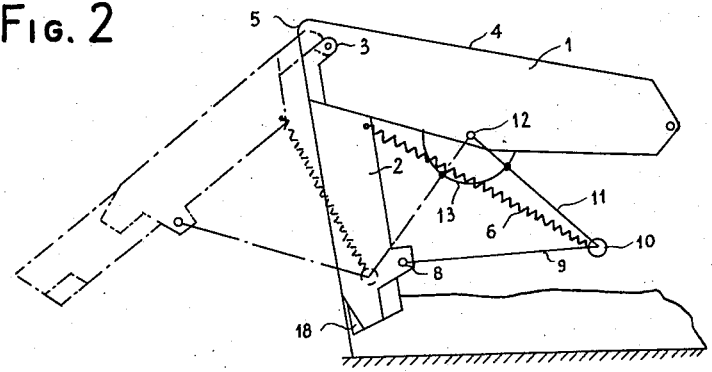
Figure 3:
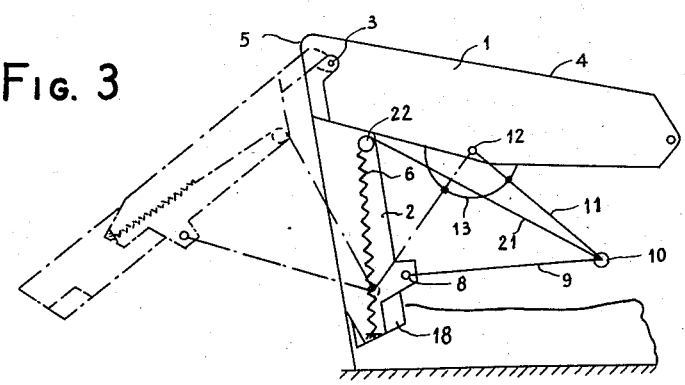

To this end, according to the invention, the leg-rest 2 is constantly urged towards this comfort position by a spring 6 which acts as a compression spring in the embodiments illustrated in Figures 1, 4, 5 and 6, whereas it acts as a tension spring in the embodiments shown in Figures 2 and 3.

A locking device such as a bolt permits a passenger occupying the seat to lock the leg-rest in the retracted position and in various extended positions. To this end, the leg-rest is articulated by a pin 8 to one end of an arm 9, the other end of which is articulated by means of a pin 10 to a second arm 11. The latter is articulated to the seat, for example to the bottom, by means of a pin 12.

The axes of these three afore-mentioned pins, each of which is represented by a dot in Figures 1 to 6, are arranged horizontally and parallel to the back of the seat.

The locking of one of the articulated arms makes it possible for the leg-rest to be locked in the selected position.

The locking device, shown in perspective in Figure 7, comprises a segment 13 secured on the bottom, for example by means of screws which are not shown. This segment is formed with holes 14 adapted to receive a projecting element 15 movable with the arm 11. The element 15 is held in any one of the holes of the segment under the action of a small spring 16.

The projecting element 15 is connected to a control element (not shown), via a link such as a cable 17. The actuation of this element permits the disengagement of the projecting element from the hole which it occupies, thus freeing the arm 11, so that the position of the leg-rest may be changed under the action of the spring 6. Since the length of the leg-rest is limited in the retracted position by the height of the bottom, an extension 18 has been provided.

According to a feature of the invention illustrated in Figures 5 to 6, the extension carries on each side a pair of rollers 19 adapted to slide in a slot 20 in the leg-rest so that the leg-rest encloses the extension in the retracted position.

It will be seen from Figure 1, in which the spring 6 is secured at a fixed point 24, and also from the following figures that a result of the pivoting movement of the leg-rest towards the comfort position, the lever arm of the spring 6 increases in length in proportion as the force of the latter diminishes. By suitably choosing the position of the fixed point 24, the couple of the spring about the pin 3 may be caused to increase during the outward movement of the leg-rest, thus substantially balancing the increase of the downwardly directed couple due to the weight of the leg-rest.

The spring 6 may act indirectly on the leg-rest. It will be seen in Figure 2 that the spring 6 acts as a tension spring on the articulation point 10 of the arms 9 and 11. This arrangement according to Figure 2 is more advantageous than that according to Figure 1, if the bottom is movable. It will also be possible to connect the spring to a point situated on one of the arms 9 and 11 other than the common articulation point 10, but this would be less advantageous.

The point at which the spring 6 is secured to the leg-rest is situated near the articulation 3. The spring tends to urge the articulation 10 of the two arms towards the front of the bottom in such manner as to cause the leg-rest to pivot towards the comfort position.

The spring 6 may also be disposed in the leg-rest as shown in Figure 3. In this case, the spring 6, which is a tension spring, acts on the articulation 10 via a flexible link such as a cable 21. The cable is displaced over a reversing pulley 22 positioned near the pivot 3, advantageously on the leg-rest.

Figure 4:
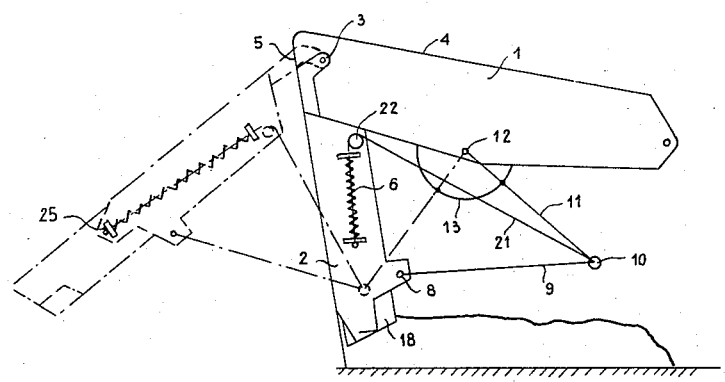

In place of a tension spring, it is also possible to use a compression spring, such as the one shown in Figure 4. This type of spring is more advantageous, since its detensioning travel is longer than that of a tension spring disposed in the leg-rest, since, on being opened, it can use the space left free by the part of the extension, whereas a tension spring is not able to do this. In this case, the spring 6 acts on a plunger 25 connected to the cable 21. The said plunger 25 is adapted to be displaced in the leg-rest under the action of the spring 6.

In all the preceding embodiments, the extension 18 may be displaced by sliding independently of the pivoting movement of the leg-rest, for example by manually actuating the extension.

This disadvantage is not present in the embodiments shown in Figure 5, in which the spring 6, acting as a compression spring, bears on the one hand on the leg-rest and on the other hand on the extension, the latter being connected to the cable 21 in such manner that the extension, when extended under the action of the spring, causes the leg-rest to pivot towards the comfort position. In this embodiment, automatic lifting of the leg-rest depends on the pulling out of the extension, whereas the lowering of the leg-rest brings about the retraction of the extension.

In the particular embodiment illustrated in Figure 6, the spring 6 acts on the extension in the same manner as in the preceding form of embodiment, but the cable 21 is connected to the extension via the plunger 25, which is adapted to be displaced in the extension.

Whilst acting on the extension 18, the spring 6 also acts on the cable, which tends to cause the leg-rest to pivot during the outward movement of the extension. When the extension has been completely moved out from the leg-rest, i.e. to the maximum of extent permitted by its stop means (not shown), the leg-rest is in an intermediate moved-out position.

A second compression spring 23 which is weaker than the first spring 6 is mounted in the extension 18 and acts on the plunger 25 connected to the cable 21. The displacement of the plunger under the action of the second spring displaces the articulation 10 towards the front of the seat, completing the movement of the leg-rest towards the comfort position.

The force of the first spring must be greater than that of the second spring, so that the latter acts only after the extension is completely extended from the leg-rest.

In order to move the leg-rest from one of the extended positions towards a lower position, for example to the retracted position, it is sufficient to unlock the device locking the arms and to exert a downward thrust on the leg-rest.

The extension must be previously retracted by hand in the form of embodiment illustrated in Figures 1 to 4, whereas in the embodiments illustrated in Figures 5 and 6, it retracts automatically under the action of the cable 21 pulled by the articulation 10.

It is also possible to provide the extension with a foot rest.

It will be apparent that the invention is not exclusively limited to the forms of embodiment illustrated and that a large number of modifications may be made to the shape, arrangement and constitution of some of the elements used in carrying the invention into effect, without thereby exceeding the scope of the present patent, provided that these modifications are not in contradiction with the subject of each of the following claims.

What I claim is:

1. A seat comprising a seat bottom, a leg-rest movable between a retracted position and a comfort position, a pivot between this leg-rest and the seat bottom situated at the front of the latter, a slidable extension in the pivoting leg-rest, an arm articulated to the seat, another arm articulated to the leg-rest, an articulation between these two arms, a spring connected to the leg-rest and to one of said arms and acting so as to constantly urge the leg-rest from its retracted position towards its comfort position, a locking means for locking said pivoting leg-rest in the desired positions, and an actuating member of said locking means so disposed that it can be manipulated by the occupant of the seat.

2. A seat comprising a seat bottom, a leg-rest movable between a retracted position and a comfort position, a pivot between this leg-rest and the seat bottom situated at the front of the latter, a slidable extension in the pivoting leg-rest, an arm articulated to the seat, another arm articulated to the leg-rest, an articulation between these two arms, a spring connected to the leg-rest and to said articulation and acting so as to constantly urge the leg-rest from its retracted position towards its comfort position, a locking means for locking said pivoting leg-rest in the desired positions, and an actuating member of said locking means so disposed that it can be manipulated by the occupant of the seat.

3. A seat comprising a seat bottom, a leg-rest movable between a retracted position and a comfort position, a pivot between this leg-rest and the seat bottom situated at the front of the latter, a slidable extension in the pivoting leg-rest, an arm articulated to the seat bottom, another arm articulated to the leg-rest, an articulation between these two arms, a spring connected to the leg-rest and to one of said arms and acting so as to constantly urge the leg-rest from its retracted position towards its comfort position, a locking means for locking said pivoting leg-rest in the desired positions, and an actuating member of said locking means so disposed that it can be manipulated by the occupant of the seat.

4. A seat comprising a seat bottom, a leg-rest movable between a retracted position and a comfort position, a pivot between this leg-rest and the seat bottom situated at the front of the latter, a slidable extension in the pivoting leg-rest, an arm articulated to the seat, another arm articulated to the leg-rest, an articulation between these two arms, a pulley arranged near the pivot of the leg-rest, a flexible link passing over this pulley and connected by one end to said articulation, a spring connected to the leg-rest and to the other end of said articulation, said spring acting so as to constantly urge the leg-rest from its retracted position towards its comfort position, a locking means for locking said pivoting leg-rest in the desired positions, and an actuating member of said locking means so disposed that it can be manipulated by the occupant of the seat.

5. A seat comprising a seat bottom, a leg-rest movable between a retracted position and a comfort position, a pivot between this leg-rest and the seat bottom situated at the front of the latter, a slidable extension in the pivoting leg-rest, an arm articulated to the seat, another arm articulated to the leg-rest, an articulation between these two arms, a pulley arranged near the pivot of the leg-rest, a flexible link passing over this pulley connected by one end to said articulation, a spring mounted in the leg-rest and connected to the leg-rest and to the other end of said articulation, said spring acting so as to constantly urge the leg-rest from its retracted position towards its comfort position a locking means for locking said pivoting leg-rest in the desired positions, and an actuating member of said locking means so disposed that it can be manipulated by the occupant of the seat.

6. A seat comprising a seat bottom, a leg-rest movable between a retracted position and a comfort position, a pivot between this leg-rest and the seat bottom situated at the front of the latter, a slidable extension in the pivoting leg-rest, an arm articulated to the seat, another arm articulated to the leg-rest, an articulation between these two arms, a pulley arranged near the pivot of the leg-rest, a flexible link passing over this pulley and connected at one end to said articulation and at the other end to said slidable extension, a spring bearing on the one hand on this extension and on the other hand on the leg-rest, said spring acting so as to constantly urge the leg-rest from its retracted position towards its comfort position, a locking means for locking said pivoting leg-rest in the desired positions, and an actuating member of said locking means so disposed that it can be manipulated by the occupant of the seat.

7. A seat comprising a seat bottom, a leg-rest movable between a retracted position and a comfort position, a pivot between this leg-rest and the seat bottom situated at the front of the latter, a slidable extension in the pivoting leg-rest, an arm articulated to the seat, another arm articulated to the leg-rest, an articulation between these two arms, a pulley arranged near the pivot of the leg-rest, a flexible link passing over this pulley and connected by one end to said articulation, a plunger connected to the other end of said flexible link, a guide for said plunger mounted in the leg-rest, a spring disposed around said guide bearing on the one hand on said slidable extension and on the other hand on the leg-rest, for constantly urging this extension outwards, stop means for limiting the outward movement of the latter, a second spring disposed in said guide bearing on the one hand on this extension and on the other hand on said plunger so as to constantly urge said articulation towards the position corresponding to the comfort position of the leg-rest, said second spring being weaker than the first spring, a locking means for locking said pivoting leg-rest, in the desired positions, and an actuating member of said locking means so disposed that it can be manipulated by the occupant of the seat.

References Cited in the file of this patent
UNITED STATES PATENTS

| | | |
|---|---|---|
| 1,310,581 | Russo | July 22, 1919 |
| 1,334,771 | McClary | Mar. 23, 1920 |
| 1,689,197 | Emmert | Oct. 30, 1928 |

FOREIGN PATENTS

| | | |
|---|---|---|
| 26,344 | Sweden | Apr. 16, 1908 |
| 488,217 | Canada | Nov. 18, 1952 |